United States Patent [19]

Curtiss

[11] 4,274,304
[45] Jun. 23, 1981

[54] IN-LINE REVERSING MECHANISM

[75] Inventor: George R. Curtiss, Chardon, Ohio

[73] Assignee: Cooper Industries, Inc., Houston, Tex.

[21] Appl. No.: 891,186

[22] Filed: Mar. 29, 1978

[51] Int. Cl.³ .................. F16H 3/44; F16H 57/10; E02D 7/02
[52] U.S. Cl. .................. 74/792; 74/789; 173/48; 173/163
[58] Field of Search .............. 173/48, 163; 74/792, 74/789, 790, 770

[56] References Cited

U.S. PATENT DOCUMENTS

| 1,099,464 | 6/1914 | Olson | 74/789 |
|---|---|---|---|
| 1,217,059 | 2/1917 | Pollard | 74/792 X |
| 1,372,268 | 3/1921 | Boener | 74/770 |
| 1,374,265 | 4/1921 | Wheeler | 74/770 X |
| 1,406,119 | 2/1922 | Watanabe | 74/789 |
| 1,648,479 | 11/1927 | Hilbert | 74/789 |
| 1,727,624 | 9/1929 | Tuttle | 74/792 |
| 2,131,677 | 9/1938 | Sharpe | 74/789 X |
| 2,448,249 | 8/1948 | Bonham | 74/792 X |
| 2,493,592 | 1/1950 | Peabody | 74/792 X |
| 2,600,762 | 6/1952 | Hartz | 74/789 X |
| 2,931,252 | 4/1960 | Ferguson et al. | 74/789 |
| 3,161,241 | 12/1964 | Allen et al. | 173/48 X |
| 3,240,083 | 3/1966 | Stoddard | 74/790 X |
| 3,404,586 | 10/1968 | Fanstone | 74/792 X |
| 3,545,305 | 12/1970 | Friend | 74/789 |
| 3,799,005 | 3/1974 | Koehler | 74/792 X |
| 3,954,028 | 5/1976 | Windish | 74/792 |
| 4,155,275 | 5/1979 | Devanney | 74/789 |

FOREIGN PATENT DOCUMENTS

| 512686 | 11/1930 | Fed. Rep. of Germany | 74/792 |
|---|---|---|---|
| 555976 | 7/1923 | France | 74/790 |

Primary Examiner—Leslie Braun
Attorney, Agent, or Firm—Wilson, Fraser, Barker & Clemens

[57] ABSTRACT

An in-line reversing mechanism for use with hand-held power tools comprises two coaxially juxtaposed epicyclic gear trains having a common carrier which may alternately be locked to or released from an outer cage to accomplish the bidirectional transmission of rotational power. The complete reversing mechanism is housed in a generally cylindrical body suitable for mounting between a conventional unidirectional motor and gear head or powered device. Forward or reverse output rotation is selected by the tool operator by moving an annular collar positioned on the periphery of the reversing mechanism to the front or rear of the mechanism.

10 Claims, 7 Drawing Figures

IN-LINE REVERSING MECHANISM

BACKGROUND OF THE INVENTION

The invention relates to a reversing mechanism for use with hand-held power tools and more particularly to an in-line reversing mechanism for use with air powered production line tools having a separable air motor and gear head between which the in-line reversing mechanism may be positioned.

Increasing dependence upon the production line method of manufacturing has created an equal dependence upon lightweight hand-held power tools for use by assembly personnel in the manufacturing process. The vast majority of these tools are powered by either compressed air or electricity. Various devices such as gear trains, ratchet mechanisms and impulse devices may be attached to relatively simple high r.p.m. motors to provide energy in the particular form required by a given assembly operation.

One of the most common requirements of such power tools is the ability to reverse the direction of drive in order to facilitate the removal of a threaded fastener which may have been improperly inserted or which must be removed in order to disassemble other components.

In electrically powered tools, directional control is a deceptive problem. It is well known that simply reversing the polarity of electricity to certain windings of the motor will effect directional control and that this can be accomplished by conventional switching means. However, it is seldom appreciated that the rotational speeds of such motors may be as high as 15,000 R.P.M. and that the sudden reversal of motor rotation subjects the driven element of a tool to severe mechanical shock which materially shortens its life. Secondly, the current surge and back EMF of the reversing motor necessitates an exceedingly heavy duty reversing switch. Unfortunately, a switch exhibiting the necessary durability is oftentimes fatiguing to the tool operator due to its high activation force.

In the case of air powered motors, the means most commonly relied upon to provide bidirectional rotation is a vane motor having two inlet ports symmetrically disposed in opposite halves of the vane motor chamber and a common exhaust port positioned midway between the ports. Air entering one inlet port and exiting through the common exhaust port causes the air motor to rotate in one direction whereas air entering the other inlet port and exiting the common exhaust port causes rotation of the motor in the opposite direction. This type of reversing air motor has one drawback. Since the air must enter and exit the vane motor in somewhat less than 180 degrees, the expansive force and thus the power produced by the air motor is less than that which can be produced in a conventional unidirectional motor wherein the radial separation of the inlet and outlet ports allows the effective utilization of the expansive power of the air over approximately 240 degrees. Thus, if the output of an air motor must be bidirectional, a certain amount of output power must be compromised to accomplish it.

The alternative to utilizing a bidirectional air or electric motor in a hand-held tool is incorporating a separate reversing mechanism into a tool having a unidirectional motor. Generally, these devices exhibit lower power output than a unidirectional tool. In this case, the power loss is due to the additional gearing in the reversing mechanism. Such reversing mechanisms also generally add substantially to the weight of the hand-held power tool. In production line work, where an operator may lift and move the tool continuously for several hours, any additional weight markedly increases operator fatigue. Furthermore, the size of the tool is also an important consideration since it is often necessary to operate the tool within the structure being assembled, such as an automobile. A bulky tool which includes the reversing capability required in an application, may, however, be unusuable because it cannot engage or cannot easily be manipulated to engage the fastener or other device it is intended to assemble due to the confined space within which it must function.

SUMMARY OF THE INVENTION

The invention comprises an in-line reversing mechanism for use with air powered hand tools having two coaxial, juxtaposed epicyclic gear trains within a common carrier which may alternately be locked to or released from an outer cage to effect the selectable bidirectional output of the air powered tool. The reversing mechanism is contained in a generally cylindrical housing having a diameter approximately equal to that of the air motor to which it is assembled and it includes a circumferential annulus which may be moved to the front of or the rear of the cylindrical housing by the operator to select either the forward or reverse rotation of the output.

In the forward or straight-through mode of operation, the carrier is locked to the outer cage. All elements of the two epicyclic gear trains thus rotate in unison and the input power is transferred directly to an output shaft. In the reverse direction, the carrier of the two epicyclic gear trains is locked to the housing of the reversing mechanism. The input power is transferred through the first epicyclic gear train to the outer cage. The outer cage is free to rotate and transfers the power to the second epicyclic gear train which transfers the power to the output shaft. Since the second epicyclic gear train consists of two gears in series whereas the first epicyclic gear train contained only single gears, the rotation of the output shaft is in the opposite direction from the input shaft.

It is thus an object of this invention to provide an in-line reversing mechanism for use with power hand tools.

It is a further object of this invention to provide such a reversing mechanism which can be retrofit to existing power hand tools separable between the motor and drive head.

It is a still further object of this invention to provide such a mechanism in a compact, lightweight device which does not add appreciably to the weight and size of the power tool.

It is a still further object of this invention to provide such a reversing mechanism having a control structure which is not only easily operable but which also clearly indicates by its forward or rearward position that the tool is operating in its forward or reverse direction, respectively.

DESCRIPTION OF THE PREFERRED EMBODIMENT

Figure 1:
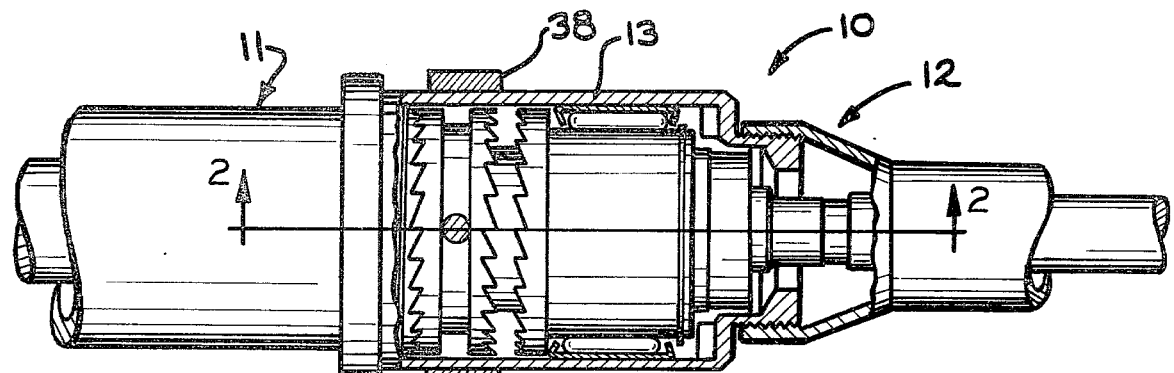
FIG. 1 is a side fragmentary sectional view of the reversing mechanism of the instant invention mounted between a motor and a drive head of a power tool.

Referring now to FIG. 1, an in-line reversing mechanism according to the instant invention is designated by the reference numeral 10. The reversing mechanism 10 is intended to be positioned between a motor housing 11 and an output head 12 of a conventional power tool. The mechanism is wholly contained within a cylindrical housing 13.

Figure 2:
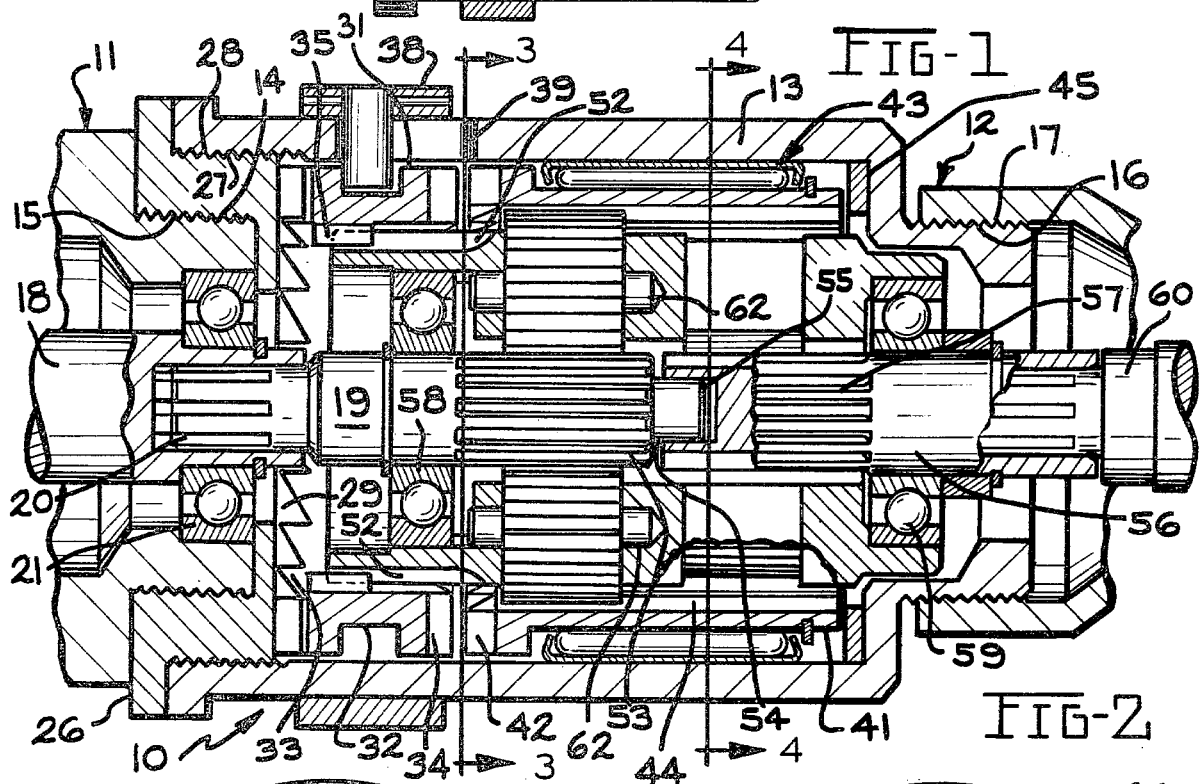
FIG. 2 is an enlarged sectional view of the reversing mechanism of the instant invention taken along line 2—2 of FIG. 1.

Referring now to FIG. 2, such mounting between the motor housing 11 and output head 12 is facilitated by female threads 14 and male threads 16 on the reversing mechanism 10 which mate with matching male threads 15 and female threads 17 on the housing 11 and head 12, respectively. A shaft 18 from the motor transfers power to an input shaft 19 through a conventional splined coupling 20. The shafts 18 and 19 are centered within the reversing mechanism 10 by a ball bearing assembly 21.

Figure 6:
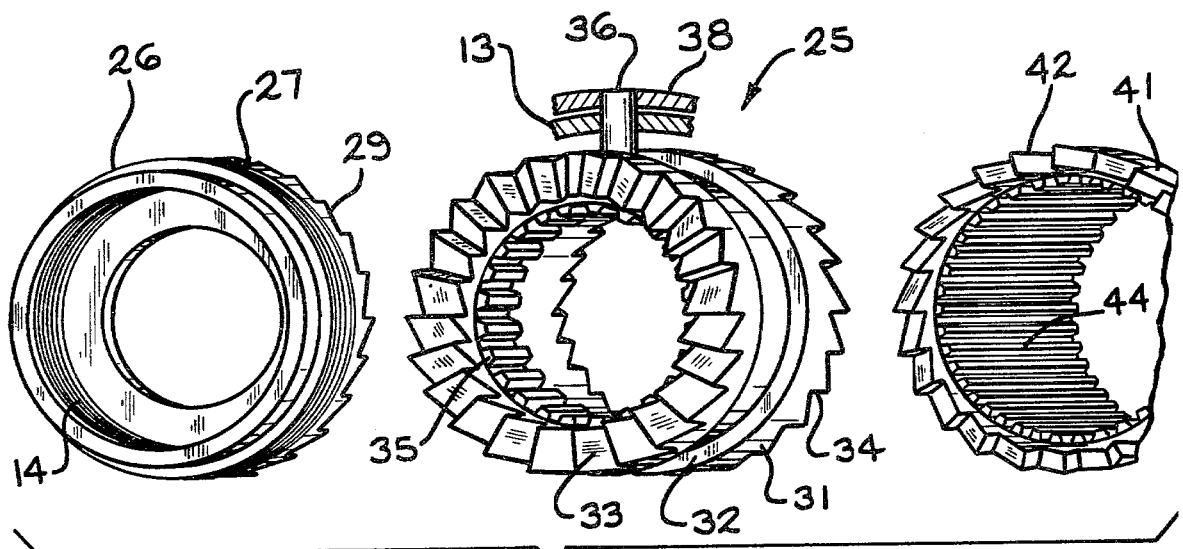
FIG. 6 is an exploded perspective view of the outer cage and common carrier locking mechanism.

Referring now to FIGS. 2 and 6, a brake assembly 25 which controls the direction of the output of the in-line reversing mechanism 10 is illustrated. The brake assembly 25 includes an outer collar 26 having male threads 27 which engage and mount the collar 26 within matching female threads 28 on the inner surface of the housing 13. On the surface of the outer collar 26 oriented away from the motor housing 11 are a set of teeth 29. The teeth 29 and others like it in the brake assembly 25 have a sawtooth-like profile and are disposed such that they permit rotation of adjacent elements in the counterclockwise direction and inhibit motion in the clockwise direction (as viewed in FIG. 6).

The brake assembly 25 further includes an axially translatable center collar 31. The center collar 31 includes a circumferential channel 32 positioned about its midsection. At both ends of the collar 31 are sets of teeth 33 and 34. The teeth 33 on the face of the collar 31 closest the air motor 11 are shaped to engage the teeth 29 on the outer collar 26. The mating teeth 29 and 33 thus permit counterclockwise rotation of the center collar 31 relative to the outer collar 26 and inhibit clockwise rotation. The center collar 31 further includes teeth 34 on the end of the center collar 31 most distant from the motor housing 11. The teeth 34 are oriented to inhibit clockwise rotation of the center collar 31 and permit counterclockwise rotation. Finally, the center collar 31 includes a set of inwardly directed splines or gear teeth 35 which rotationally engage other elements of the reversing mechanism 10 while simultaneously permitting relative axial motion of the center collar 31 relative to these engaged elements.

Figure 5:
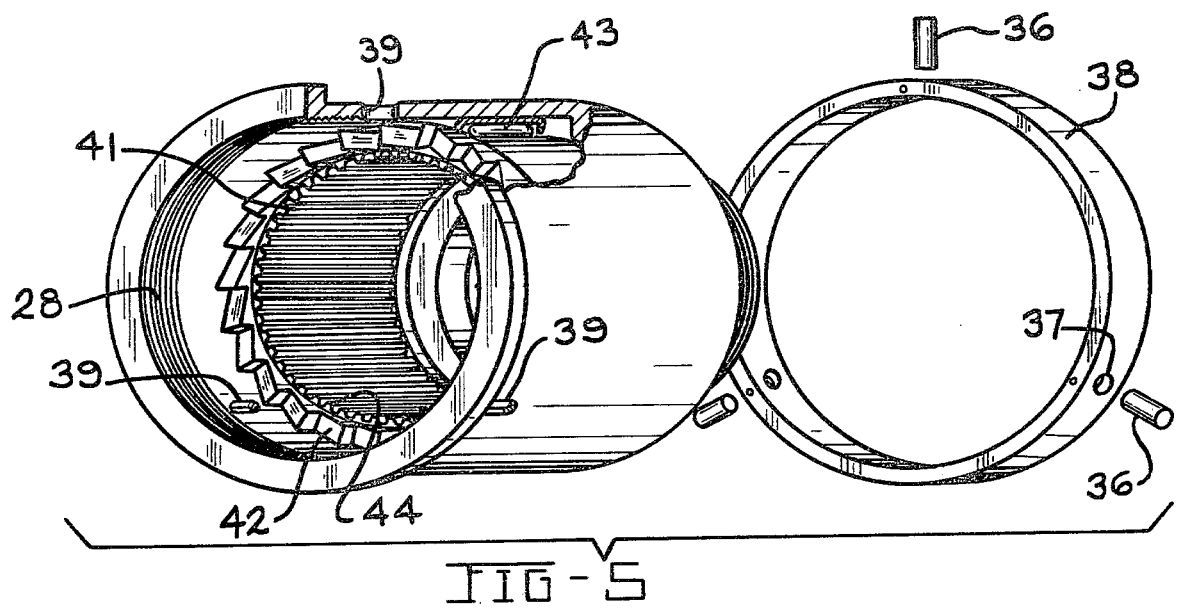
FIG. 5 is an exploded perspective view of the housing, control ring and outer cage of a reversing mechanism of the instant invention.

Referring now to FIGS. 2 and 5, the center collar 31 is retained within the housing 13 by a plurality of retainer pins 36. The retainer pins 36 pass through openings 37 in a control ring 38, through longitudinally oriented slots 39 in the housing 13 and engage the circumferential channel 32 in the center collar 31.

The retainer pins 36 may be a friction fit within the openings 37 in the control ring 38 or may be secured therein by an appropriate semi-permanent attachment means. The retainer pins 36 thus positively engage the center collar 31 and allow an operator to position the center collar 31 to a forward or rearward position and control the direction of the output of the reversing mechanism 10 in a manner to be described subsequently.

Referring now to FIGS. 5 and 6, a rotatable cage or inner collar 41 is illustrated. At the end of inner collar 41 most proximate the housing 11 is a fourth set of teeth 42 which are selectably engagable with the clutch teeth 34 on the center collar 31. The clutch teeth 42 are oriented such that clockwise motion of the inner collar 41 relative to the center collar 31 is permitted whereas counterclockwise rotation is inhibited. The inner collar 41 is coaxially positioned and rotatably mounted within the housing 13 by means of a needle bearing assembly 43. On the inner surface of the inner collar 41 is a set of gear teeth 44 which extends substantially the full length of the inner collar 41. The gear teeth 44 cooperate with the gears in an epicyclic gear assembly 50 which will be described below. The housing 13 also includes a concentrically disposed thrust ring 45 disposed between the end of the inner collar 41 opposite the teeth 42 and the housing 13. The thrust ring 45 provides a bearing surface against which the inner collar 41 may bear as it rotates.

Figure 7:
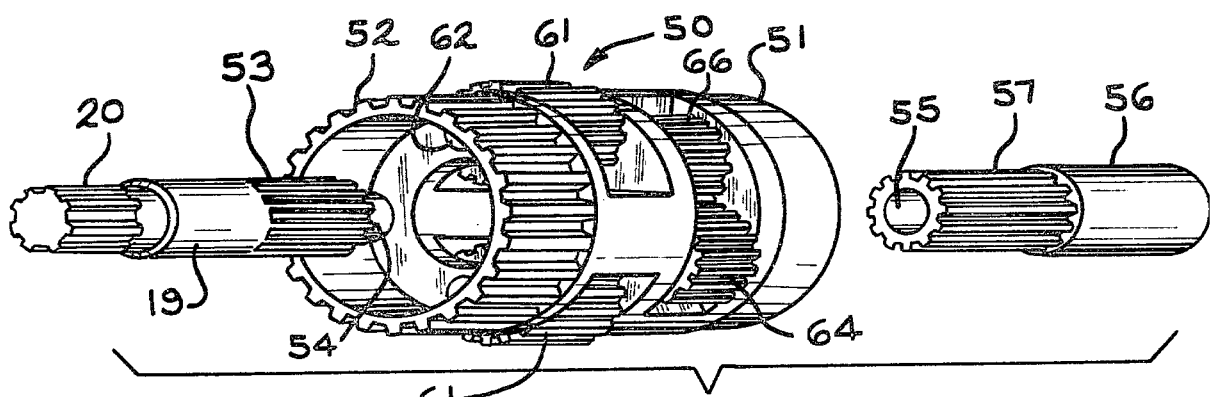
FIG. 7 is an exploded perspective view of the two epicyclic gear trains and common gear train carrier of the reversing mechanism of the instant invention.

Referring now to FIG. 7, the epicyclic gear assembly 50 includes a carrier 51 which positions and retains the various gears of the epicyclic gear trains. At the end of the carrier 51 adjacent the outer and center collars 26 and 31, respectively, is a male splined surface 52 which mates with the female splined surface 35 of the center collar 31. The center collar 31 may thus translate axially relative to the carrier 51 while at the same time being in positive rotational engagement with it.

Referring now to FIGS. 2 and 7, the input shaft 19 has gear teeth 53 at its end opposite the splined coupling 20. The input shaft 19 is terminated at this end with a reduced diameter portion 54 which is seated within a blind hole 55 in an output shaft 56. The output shaft 56 further includes a set of gear teeth 57 at the end containing the blind hole 55. In addition to the centering of the input shaft 19 and the output shaft 56 provided by the mating of the reduced diameter portion 54 of the input shaft 19 in the blind hole 55 of the output shaft 56, a ball bearing assembly 58 is provided to center the input shaft 19 within the carrier 51 and a ball bearing assembly 59 provides like centering for the output shaft 56. A splined shaft 60 transfers power out of the reversing mechanism 10.

Figure 3:
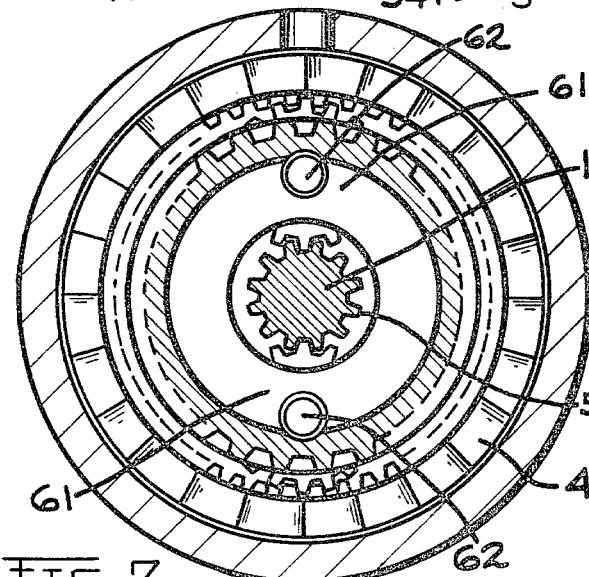
FIG. 3 is an axial sectional view of the reversing mechanism of the instant invention taken along line 3—3 of FIG. 2.

Referring now to FIGS. 2, 3 and 7, the epicyclic gear assembly 50 includes a first set of idler gears 61 positioned on stub shafts 62. The idler gears 61 engage the gear teeth 53 on the input shaft 19 as well as the gear teeth 44 on the inner surface of the inner collar 41.

Figure 4:
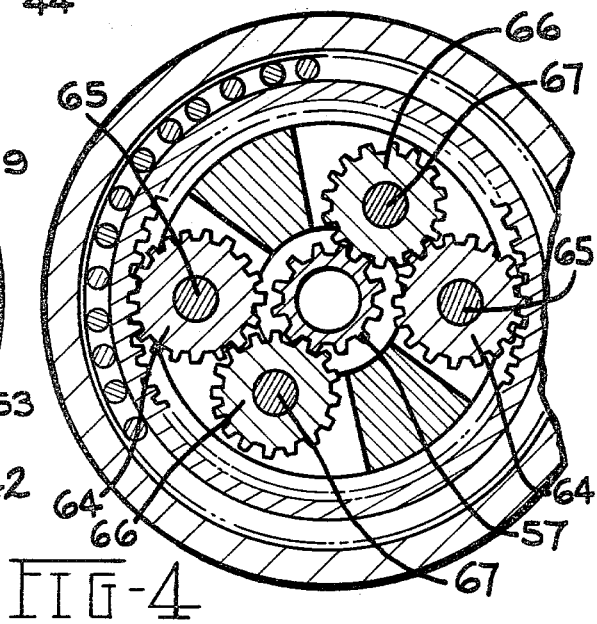
FIG. 4 is an axial sectional view of the reversing mechanism of the instant invention taken along line 4—4 of FIG. 2.

Reference to FIGS. 2, 4 and 7 will clarify the location of the second gear train contained in the epicyclic gear assembly 50. This gear train comprises a second set of two idler gears 64 mounted on a pair of stub shafts 65 and positioned between the gear teeth 44 on the inner surface of the inner collar 41 and a third set of two idler gears 66. The third set of idler gears 66 are mounted on a pair of stub shafts 67 which position them between the second set of idler gears 64 and the gear 57 on the output shaft 56.

Having thus described the components of the in-line reversing mechanism 10 in detail, the operation of the reversing mechanism 10 will now be described with reference to FIG. 2. When the control ring is in its forward position, to the right as illustrated in FIG. 2, the output shaft 56 rotates in the same direction as the input shaft 19. For example, with the control ring 38 in the forward position, the teeth 34 and 42 are engaged. The splined surfaces 35 on the center collar 31 and 52 on the carrier 51 are, of course, permanently rotationally engaged and thus the center collar 31, the inner collar 41 and the carrier 51 are all locked together and rotate in unison. Since the inner collar 41 and the carrier 51 are locked together, the three sets of idler gears 61, 64 and 66 are likewise locked. Thus, the rotation of the input shaft 19 will be transmitted through the reversing mechanism 10 directly to the output shaft 56 which will, of course, rotate in the same direction as the input shaft 19.

With the control ring 38 moved to its rearward position, or to the left as shown in FIG. 2, the output shaft 56 rotates in a direction opposite to the direction of rotation of the input shaft 19. With the control ring 38 moved to the left, the teeth 34 on the center collar 31 are disengaged from the teeth 42 on the inner collar 41 and the teeth 33 of the inner collar 31 are engaged with the teeth 29 of the outer collar 26. Thus, the inner collar 41 is free to rotate within the needle bearing assembly 43 whereas the carrier 51 is positively rotationally locked to the housing 13 through the mating splines 35 and 52 and teeth 33 and 29. The rotation of the input shaft 19 will impart rotation in the opposite direction of the first set of idler gears 61. The idler gears 61 in turn will cause the inner collar 41 to rotate in the same direction. Inner collar 41 transfers the rotational energy to the second set of idler gears 64 which rotate in the same direction as the inner collar 41 and the first set of idler gears 61. The third set of idler gears 66 are then rotated by the second set of idler gears 64 but in the reverse direction which is the same direction as the rotation of the input shaft 19. Finally, power is transferred from the third set of idler gears 66 to the gear 57 on the output shaft 56. The direction of rotation of the output shaft 56, being opposite to the direction of rotation of the third set of idler gears 66 is thus in the reverse direction of the input shaft 19. Thus, it can be appreciated that forward or reverse rotation of the output shaft 56 relative to the input shaft 19 can be effected by sliding the control ring 38 forward or rearward, respectively, on the housing 13 of the in-line reversing mechanism 10.

It will be apparent to those skilled in the art that various modifications may be made to the preferred embodiment described above without departing from the spirit and scope of the following claims.

What I claim is:

1. A reversing mechanism for a power tool comprising, in combination, a housing, an input shaft having gear teeth, an output shaft having gear teeth, a rotatable cage disposed about said shafts and having gear teeth on its inner surface, a gear carrier intermediate said shafts and said cage, a pair of gears mounted within said carrier and meshed with said input shaft gear teeth and said cage gear teeth, a pair of gear trains each including two meshed gears mounted within said carrier, one gear of each of said gear trains meshed with said output shaft gear teeth and the other gear of each of said gear trains meshed with said cage gear teeth, and a brake collar operatively engaged with said gear carrier and having a first position in which said collar is coupled to said cage and a second position in which said collar is coupled to said housing, whereby bidirectional rotation of said output shaft is achieved from unidirectional rotation of said input shaft by selective positioning of said collar.

2. The reversing mechanism of claim 1 which further includes an annular bearing race positioned between said rotatable cage and said housing and mounting said rotatable cage within said housing.

3. The reversing mechanism of claim 1 which further includes an annulus disposed about said housing and operably linked to said brake collar, said annulus having a first, forward position nearest the front of said power tool and a second, rearward position nearest the rear of said power tool, whereby when said annulus is in said first position said input shaft and said output shaft rotate in the same direction and when said annulus is in said second position said input shaft and said output shaft rotate in opposite directions.

4. A reversing mechanism for a power tool comprising, in combination, a housing, means for mounting said housing to a drive unit and to a driven unit, an input shaft having gear teeth, an output shaft having gear teeth, a cage coaxially disposed about said shafts having gear teeth on its inner surface, bearing means for rotatably mounting said cage within said housing, a gear carrier intermediate said shafts and said cage, a pair of gears mounted in said carrier and meshed with said input shaft gear teeth and said cage gear teeth, a pair of gear trains each including two meshed gears mounted in said carrier, one gear of each of said gear trains meshed with said output shaft gear teeth and the other gear of each of said gear trains meshed with said cage gear teeth, and a brake collar engaged for rotation with said carrier, said collar having a first position in which said collar is coupled to said cage and a second position in which said collar is coupled to said housing, whereby bidirectional rotation of said output shaft is achieved from unidirectional rotation of said input shaft by selective positioning of said collar.

5. The reversing mechanism of claim 4 wherein said input shaft and said output shaft are coaxially aligned.

6. The reversing mechanism of claim 4 wherein said bearing means comprises a plurality of needle bearings.

7. The reversing mechanism of claim 4 wherein said collar includes radially disposed teeth on its front and rear faces.

8. A reversing mechanism comprising, in combination, an input shaft having gear teeth, an output shaft having gear teeth, a cage disposed for rotation about said shafts and having gear teeth on an inner surface, a carrier disposed intermediate said shafts and said cage, first gear means rotatably mounted in said carrier for rotationally interconnecting said input shaft and said cage, second gear means rotatably mounted in said carrier for rotationally interconnecting said output shaft and cage, and moveable means disposed for rotation with said carrier for prohibiting relative rotation between said carrier and said cage in a first position and prohibiting rotation of said carrier in a second position whereby bidirectional rotation of said output shaft is achieved from unidirectional rotation of said input shaft by selective positioning of said moveable means.

9. The reversing mechanism of claim 8 wherein said moveable means defines an annular collar having first and second sets of teeth disposed between a stationary third set of teeth and a fourth set of teeth on said cage.

10. The reversing mechanism of claim 9 wherein said teeth of said sets of teeth have sawtooth profiles.

* * * * *